(12) United States Patent
Ramappan et al.

(10) Patent No.: US 8,452,520 B2
(45) Date of Patent: May 28, 2013

(54) CONTROL SYSTEM AND METHOD FOR LOW QUANTITY FUEL INJECTION

(75) Inventors: Vijay Ramappan, Novi, MI (US);
Jun-Mo Kang, Ann Arbor, MI (US);
Peter Kafarnik, Eltville-Erbach (DE);
Jonathan T. Shibata, Whitmore Lake, MI (US)

(73) Assignee: GM Global Technology Operations LLC

( * ) Notice: Subject to any disclaimer, the term of this patent is extended or adjusted under 35 U.S.C. 154(b) by 522 days.

(21) Appl. No.: 12/791,385

(22) Filed: Jun. 1, 2010

(65) Prior Publication Data

US 2011/0295488 A1 Dec. 1, 2011

(51) Int. Cl.
*F02D 41/30* (2006.01)
*G06F 17/00* (2006.01)

(52) U.S. Cl.
USPC .......................................... 701/103; 123/299

(58) Field of Classification Search
USPC .................. 701/103–105, 102, 115; 123/299, 123/300, 304, 305, 431, 435, 478, 480
See application file for complete search history.

(56) References Cited

U.S. PATENT DOCUMENTS

| | | | | |
|---|---|---|---|---|
| 4,819,604 A | * | 4/1989 | Koike et al. ................... | 123/478 |
| 4,911,132 A | * | 3/1990 | Nakaniwa et al. ............. | 123/478 |
| 7,152,574 B2 | * | 12/2006 | Mashiki et al. ................ | 123/304 |

* cited by examiner

*Primary Examiner* — Hieu T Vo

(57) ABSTRACT

A control system for an engine includes a parameter determination module and a period determination module. The parameter determination module determines a first fuel injection parameter based on a rate of change of a quantity of fuel injected during a period, and determines a second fuel injection parameter based on an initial quantity of fuel injected during the period. The period determination module determines a desired fuel injection period based on a desired fuel injection quantity, the first and second fuel injection parameters, and at least one of mass air flow (MAF) rate, intake air temperature (IAT), fuel injector pressure (FIP), engine coolant temperature (ECT), and exhaust gas air/fuel (A/F) ratio.

20 Claims, 4 Drawing Sheets

CONTROL SYSTEM AND METHOD FOR LOW QUANTITY FUEL INJECTION

FIELD

The present disclosure relates to internal combustion engines, and more particularly to a system and method for controlling injection of small quantities of fuel.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines draw air into an intake manifold through an inlet system that may be regulated by a throttle. The air in the intake manifold may be distributed to a plurality of cylinders and combined with fuel to create an air/fuel (A/F) mixture. The fuel may be provided via a plurality of fuel injectors located at intake ports of the cylinders (i.e., port fuel injection) or in the cylinders (i.e., direct fuel injection). The A/F mixture may be compressed by pistons and combusted within the cylinders to drive the pistons and rotatably turn a crankshaft generating drive torque. The drive torque may be transferred from the crankshaft to a driveline (e.g., wheels) of a vehicle via a transmission.

Homogeneous charge compression ignition (HCCI) engines may operate in one of a plurality of modes depending on operation conditions. Specifically, HCCI engines may operate in a spark ignition (SI) combustion mode, an HCCI combustion mode, or a mixed combustion mode. For example, the HCCI combustion mode may be used at medium engine loads and the SI combustion mode may be used at high engine loads. The mixed combustion mode, on the other hand, may be used during low engine loads.

Specifically, the SI combustion mode may include compressing the A/F mixture and igniting the compressed A/F mixture with spark provided via spark plugs in the cylinders. The HCCI combustion mode, on the other hand, may include compressing the A/F mixture until a critical pressure and/or temperature is reached and the A/F mixture automatically combusts. In the mixed combustion mode, multiple ignition and fuel injection events may occur to promote HCCI combustion. In other words, the mixed combustion mode may include compressing the A/F mixture until the A/F mixture automatically combusts, meanwhile providing "assistance" to the combustion with pre-injection of fuel and pilot ignition provided via the spark plugs ("spark assist").

SUMMARY

A control system for an engine includes a parameter determination module and a period determination module. The parameter determination module determines a first fuel injection parameter based on a rate of change of a quantity of fuel injected during a period, and determines a second fuel injection parameter based on an initial quantity of fuel injected during the period. The period determination module determines a desired fuel injection period based on a desired fuel injection quantity, the first and second fuel injection parameters, and at least one of mass air flow (MAF) rate, intake air temperature (IAT), fuel injector pressure (FIP), engine coolant temperature (ECT), and exhaust gas air/fuel (A/F) ratio.

A method for controlling fuel injection in an engine includes determining a first fuel injection parameter based on a rate of change of a quantity of fuel injected during a period, determining a second fuel injection parameter based on an initial quantity of fuel injected during the period, and determining a desired fuel injection period based on a desired fuel injection quantity, the first and second fuel injection parameters, and at least one of mass air flow (MAF) rate, intake air temperature (IAT), fuel injector pressure (FIP), engine coolant temperature (ECT), and exhaust gas air/fuel (A/F) ratio.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
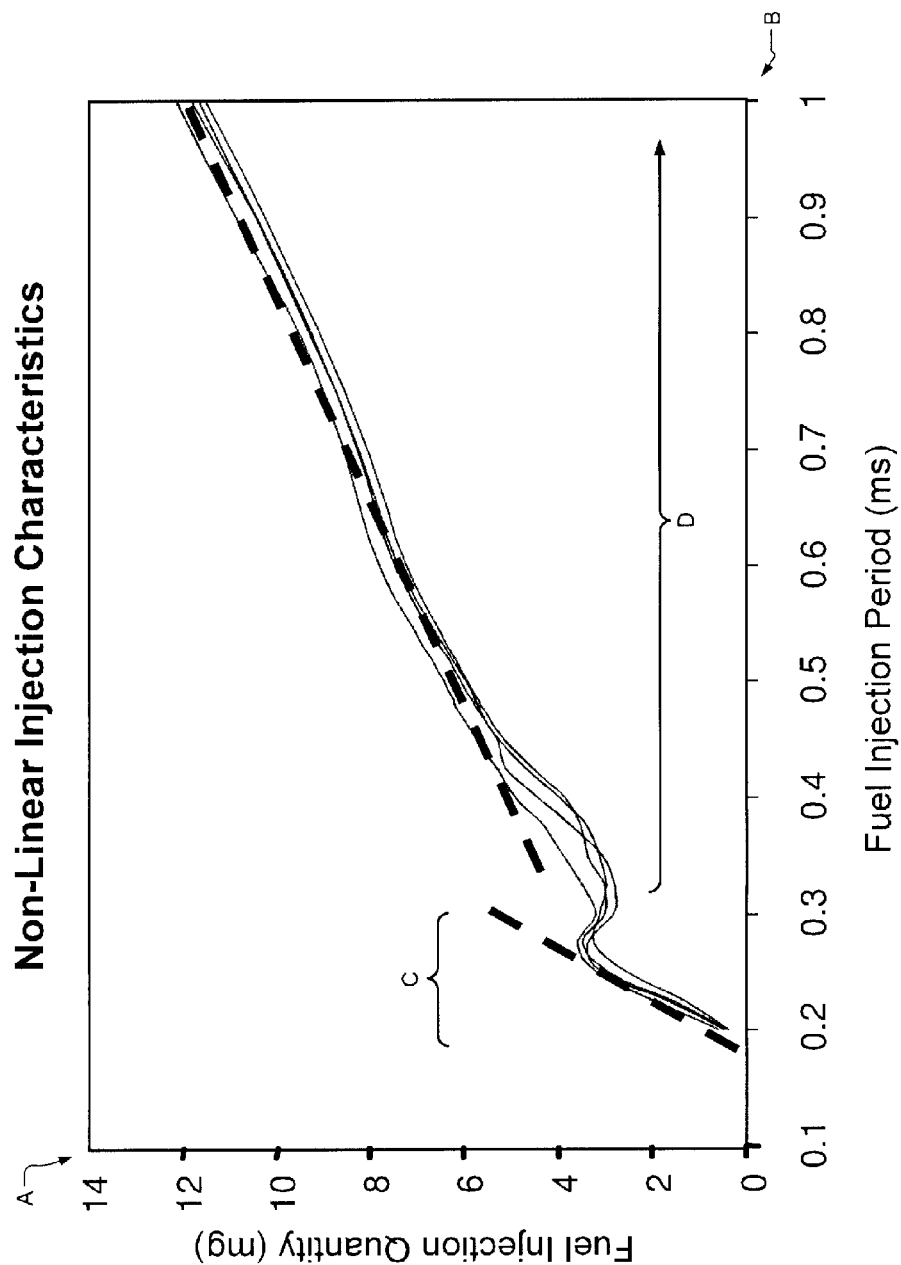
FIG. 1 is a graph illustrating non-linear injection characteristics of an exemplary fuel injector according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

HCCI combustion includes compressing an air/fuel (A/F) mixture using pistons until the A/F mixture reaches a critical pressure and/or temperature and automatically combusts. HCCI combustion may also include multiple injections of fuel (e.g., two, three, or four) during each combustion cycle and/or lean A/F mixtures. The fuel injectors, however, may have non-linear relationship between "injector flow" and "commanded injector opening duration" or "pulse width" across an entire operating range of the injector. Fuel injectors, however, may have linear relationships in certain segments of the operating range but have different rates of fuel flow versus pulse width depending on the injector operating environment.

Referring now to FIG. 1, a graph illustrating non-linear injection characteristics of an exemplary fuel injector are shown. A vertical axis (A) represents fuel injection quantity and a horizontal axis (B) represents fuel injection period. For example, the vertical axis A may range from 0 to 14 milligrams (mg) and the horizontal axis B may range from 0 to 1 millisecond (ms). As shown, the rate of fuel injection is different (i.e., non-linear) during two different periods: a first period (C) (e.g., from 0.2 ms to 0.3 ms) and a second period (D) (e.g., from 0.3 ms onward). Specifically, the rate of fuel injection during the first period C is greater than the rate of fuel injection during the second period D (e.g., approximately 40 mg/ms versus approximately 12-13 mg/ms, respectively).

Thus, when injecting small quantities of fuel (e.g., less than 3 mg), the rate of fuel injection may be highly sensitive to injection period. Therefore, fuel injectors may require precise control to prevent inaccuracy when injecting small quantities of fuel. Specifically, a small change in a ratio of the A/F mixture may affect combustion and thus may decrease performance, decrease drivability. and/or increase emissions. For example, inaccurate control of a quantity of fuel injected may affect torque output of the HCCI engine, may increase noise, vibration, and/or harshness (NVH) characteristics, and/or may increase hydrocarbon (HC) emissions in exhaust gas.

Accordingly, a system and method is presented for controlling fuel injectors when injecting small quantities of fuel. The system and method may be implemented when a desired quantity of fuel is less than a predetermined quantity. For example only, the predetermined quantity may be 3 mg. The system and method determine the desired fuel quantity based on a mass airflow (MAF) rate into the engine and a desired A/F ratio. For example, the desired A/F ratio may be based on the combustion mode (e.g., HCCI, mixed, or spark ignition—SI) and/or other parameters (e.g., driver input).

The system and method may then determine a plurality of fuel injection parameters based on a fuel injection quantity and a corresponding injection period (e.g., a pulse width). In other words, the system and method may learn the plurality of fuel injection parameters because a relationship between fuel injection quantity and fuel injection period may be relatively linear (e.g., from 1 mg to 3 mg). For example, the system and method may determine first and second parameters indicating slope and offset, respectively, of the relationship between fuel injection quantity and fuel injection period.

The system and method may then store the plurality of fuel injection parameters. The stored fuel injection parameters may then be retrieved based on a plurality of engine operating parameters. In other words, the stored fuel injection parameters are retrieved and may be modified as a function of the plurality of engine operating parameters. For example, the plurality of engine operating parameters may include intake air temperature (IAT), fuel injector pressure, and engine coolant temperature. The plurality of engine operating parameters, however, may include other engine operating parameters such as estimated injector temperature.

The system and method may then determine an injection period based on the desired fuel quantity and the retrieved fuel injection parameters. The system and method may then control fuel injection by generating control signals for the fuel injectors based on the determined injection period. For example, the control signals may include pulse-width modulated (PWM) signals having the determined injection period. Additionally, the determined injection period (commanded to the fuel injectors) may be used in a subsequent iteration of learning the plurality of fuel injection parameters.

Figure 2:
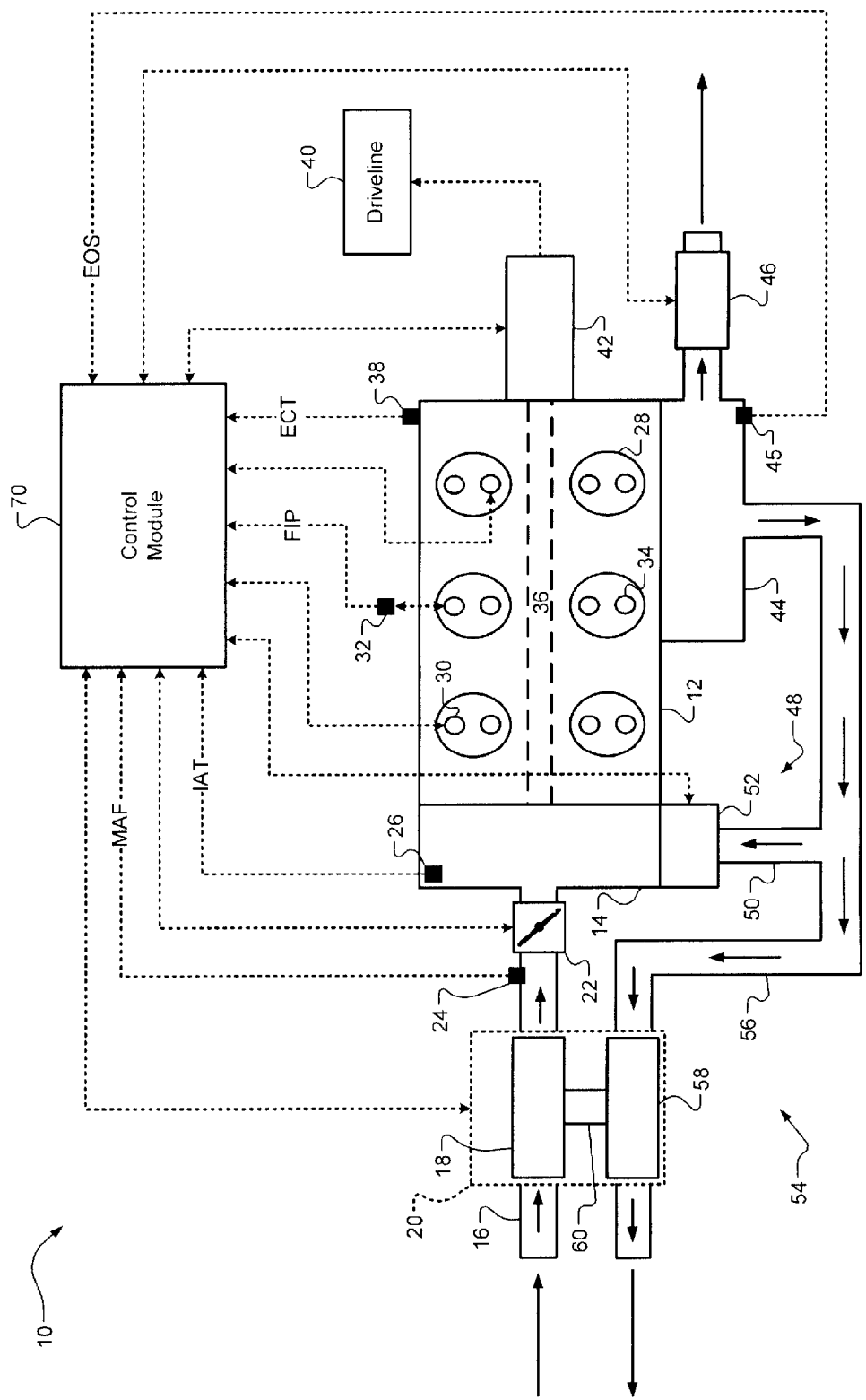
FIG. 2 is a functional block diagram of an exemplary engine system according to the present disclosure.

Referring now to FIG. 2, an engine system 10 includes an engine 12. For example, the engine 12 may be an HCCI engine. The engine 12, however, may also be a different type of engine (e.g., SI, diesel, etc.). The engine 12 draws air into an intake manifold 14 through an inlet system 16 that may be regulated by a throttle 22. For example, the throttle 22 may be electronically controlled (e.g., electronic throttle control, or ETC). A compressor 18 of a turbocharger 20 (also referred to as "turbo 20") may pressurize (i.e., boost) the air drawn into the intake manifold 14. A MAF sensor 24 may measure a MAF rate through the inlet system 16. An IAT sensor 26 may measure a temperature of the air in the intake manifold 14. While both the MAF sensor 24 and the IAT sensor 26 are shown, however, a MAF-IAT sensor may be implemented that measures both MAF and IAT.

The air in the intake manifold 14 may be distributed to a plurality of cylinders 28. While six cylinders are shown, the engine 12 may include other numbers of cylinders. The air in the cylinders 28 may be mixed with fuel from a plurality of fuel injectors 30 to create the A/F mixture. For example, the fuel injectors 30 may inject the fuel via intake ports of the cylinders 28 (i.e., port fuel injection) or directly into the cylinders 28 (i.e., direct fuel injection). A fuel injector pressure (FIP) sensor 32 may measure fuel pressure supplied to the fuel injectors 30. For example, the FIP sensor 32 may measure a fuel pressure in a fuel rail (not shown) that supplies pressurized fuel to the fuel injectors 30. While one fuel pressure sensor is shown, however, other numbers of fuel pressure sensors may be implemented (e.g., one per fuel injector). Moreover, the fuel pressure may also be measured or modeled using other suitable sensors and/or methods.

The A/F mixture may be compressed by pistons (not shown) within the cylinders 28. In the HCCI combustion mode, for example, the A/F mixture may be compressed until the A/F mixture reaches a critical pressure and/or temperature and automatically combusts. The engine 12, however, may also include a plurality of spark plugs 34 used to either "spark assist" (e.g., in a mixed combustion mode) or SI combustion (e.g., in an SI combustion mode). For example, the engine 12 may operate in the HCCI and SI combustion modes at medium and high engine loads, respectively, and may operate in the mixed combustion mode during low engine loads.

The combustion of the A/F mixture within the cylinders 28 drives the pistons (not shown) which rotatably turn a crankshaft 36 generating drive torque. An engine coolant temperature (ECT) sensor 38 may measure temperature of engine coolant. The coolant temperature, however, may also be measured or modeled using other suitable sensors and/or methods. The drive torque may be transferred from the crankshaft 36 to a driveline 40 (e.g., wheels) of a vehicle via a transmission 42. The transmission 42 may also be coupled to the crankshaft 36 via a fluid coupling such as a torque converter (not shown).

Exhaust gas resulting from combustion may be expelled from the cylinders 28 into an exhaust manifold 44. An exhaust oxygen ($O_2$) sensor (EOS) 45 measures an A/F ratio of the exhaust gas. An exhaust treatment system (ETS) 46 may treat the exhaust gas to reduce emissions before releasing the exhaust gas into the atmosphere. For example, the ETS 46 may include at least one of oxidation catalysts (OCs), NOx absorbers/adsorbers, selective catalytic reduction (SCR) catalysts, particulate matter (PM) filters, and catalytic converters. The exhaust gas may also be recirculated into the intake manifold 14 via an exhaust gas recirculation (EGR) system 48 that includes an EGR line 50 and an EGR valve 52.

In other words, the EGR line 50 may connect the exhaust manifold 44 to the intake manifold 14 and the EGR valve 52 may regulate an amount of exhaust gas introduced into the intake manifold 14.

Furthermore, the exhaust gas may routed through a turbine system 54 that includes a turbine line 56 and a turbine 58 (part of the turbocharger 20). The exhaust gas may rotate the turbine 58 before being released into the atmosphere. The exhaust gas, however, may also be treated to decease emissions (similar to the ETS 46) before being released into the atmosphere. The turbine 58 powers the compressor 18 via a shaft 60 of the turbocharger 20. Moreover, while the EGR system 48 and the turbine system 54 are shown to share a port of the exhaust manifold 44, the EGR system 48 and the turbine system 54 may have separate ports (and thus a separate EGR line 50 and turbine line 56).

A control module 70 controls operation of the engine system 10. More specifically, the control module 70 may communicate with various components of the engine system 10. The control module 70 may receive signals from the turbocharger 20, throttle 22, the MAF sensor 24, the IAT sensor 26, the fuel injectors 30, the FIP sensor(s) 32, the spark plugs 34, the ECT sensor 38, the transmission 42, the EOS 45, the ETS 46, and/or the EGR valve 52. Moreover, the control module 70 may control the turbocharger 20 (e.g., boost pressure), the throttle 22 (e.g., ETC), the fuel injectors 30, the spark plugs 34, the transmission 42, the ETS 46, and/or the EGR valve 52. The control module 70 may also implement the system and/or method of the present disclosure.

Figure 3:
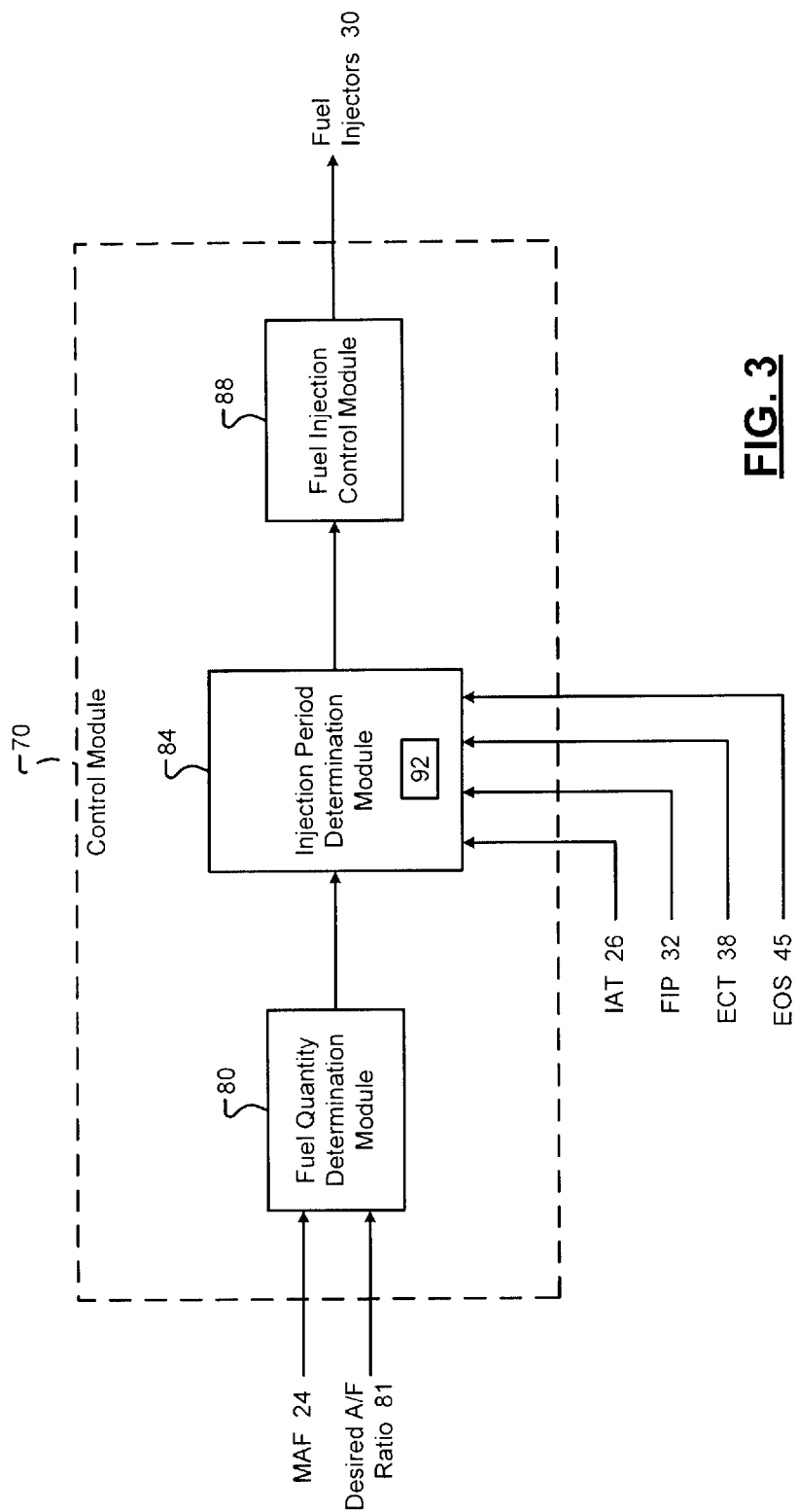
FIG. 3 is a functional block diagram of an exemplary control module according to the present disclosure.

Referring now to FIG. 3, the control module 70 is shown in more detail. The control module 70 may include a fuel quantity determination module 80, an injection period determination module 84, and a fuel injection control module 88. The injection period determination module 84 may further include sub-modules such as a parameter determination module (not shown) that determines the plurality of fuel injection parameters and a period determination module (not shown) that determines the injection period. The control module 70 may also include memory 92. For example, the memory 92 may include non-volatile memory (NVM) and may be located in the injection period determination module 84 (as shown). The memory 92, however, may also be located elsewhere in the control module 70.

The fuel quantity determination module 80 determines the desired fuel quantity (e.g., desired fuel mass). The fuel quantity determination module 80 may determine the desired fuel quantity based on the MAF rate into the engine 12 and a desired A/F ratio of the engine 12 (represented by signal 81). For example, the MAF rate may be measured by the MAF sensor 24 and the desired A/F ratio of the engine 12 may be based on the combustion mode of the engine 12 (e.g., HCCI combustion mode, mixed combustion mode, or SI combustion mode). In other words, each of the plurality of combustion modes may include a predetermined desired A/F ratio. The desired A/F ratio, however, may also be based on other parameters such as input from a driver of the vehicle (e.g., via an accelerator pedal).

The injection period determination module 84 receives the desired fuel quantity from the fuel quantity determination module 80. The injection period determination module 84 also receives signals indicating the plurality of engine operating parameters. For example, the signals may indicate intake air temperature (IAT), fuel injector pressure (FIP), engine coolant temperature (ECT), and exhaust gas A/F ratio (EOS), and the signals may be generated by the IAT sensor 26, the FIP sensor 32, the ECT sensor 38, and the EOS 45, respectively. The injection period determination module 84, however, may also receive other signals indicating other engine operating parameters.

The injection period determination module 84 determines an injection period based on the desired fuel quantity, a calculated fuel quantity, and a plurality of fuel injection parameters. The calculated fuel quantity is based primarily on the MAF (e.g., from MAF sensor 24) and the exhaust gas A/F ratio (e.g., from the EOS 45). The plurality of fuel injection parameters may be determined based on the relationship between fuel injection quantity and fuel injection period. For example, the plurality of fuel injection parameters may be determined (i.e., learned) after a first injection event. Specifically, the plurality of fuel injection parameters may include a first fuel injection parameter (A) and a fuel injection second parameter (B).

The first fuel injection parameter A may indicate a slope of the relationship between fuel injection quantity and fuel injection period. In other words, the first fuel injection parameter A may be based on a rate of change of a quantity of fuel injected during a period. The second fuel injection parameter B, on the other hand, may indicate an offset (i.e., intercept) of the relationship between fuel injection quantity and fuel injection period. In other words, the second fuel injection parameter B may be based on an initial quantity of fuel injected during the period.

More specifically, the fuel injection parameters A and B may be determined as follows:

$$\text{Fuel Injection Period} = (A \times \text{Desired Fuel Quantity}) + B \quad (1).$$

Additionally or alternatively, however, the fuel injection parameters A and B may be determined in order to minimize error between desired fuel quantity and calculated fuel quantity (i.e., based primarily on MAF and exhaust gas A/F ratio). The fuel injection parameters A and B may be determined when the engine 12 is operating at a low load in mixed combustion mode where equal fuel quantity injections are applied.

The plurality of fuel injection parameters may be then be stored. For example, the injection period determination module 84 may store the plurality of fuel injection parameters in memory 92. The plurality of fuel injection parameters may then be retrieved based on the plurality of engine operating parameters. For example, the injection period determination module 84 may retrieve the plurality of fuel injection parameters from the memory 92 and may modify the plurality of fuel injection parameters based the plurality of engine operating parameters (e.g., IAT, FIP, ECT, etc.). More specifically, the plurality of fuel injection parameters A and B may be stored as compensations as mathematical functions of IAT, FIP, and ECT. Additionally, the determined fuel injection period may be used in a subsequent determination (i.e., learning) of the plurality of fuel injection parameters.

The fuel injection control module 88 receives the determined fuel injection period from the injection period determination module 84. The fuel injection control module 88 may control fuel injection based on the determined fuel injection period. More specifically, the fuel injection control module 88 may generate control signals for the fuel injectors 30 based on the determined fuel injection period. For example, the control signals may include PWM signals having the determined fuel injection period.

Figure 4:
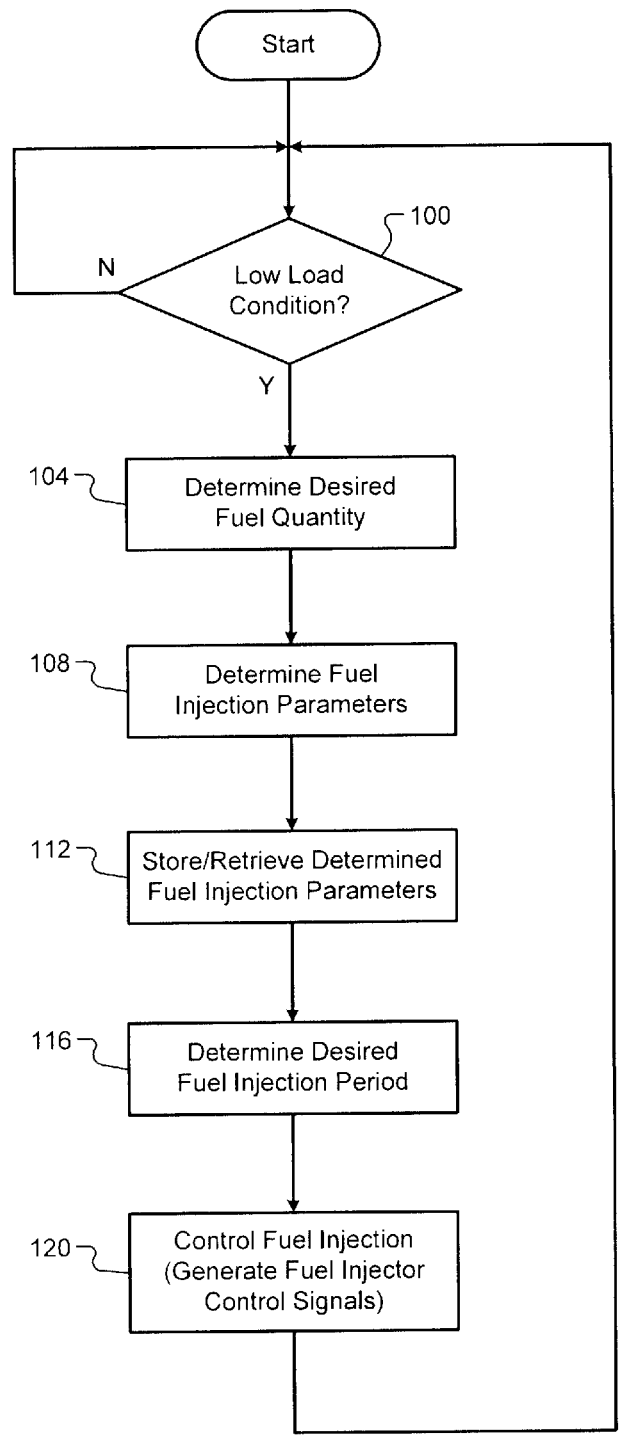
FIG. 4 is a flow diagram of an exemplary method for controlling injection of small quantities of fuel according to the present disclosure.

Referring now to FIG. 4, a method for controlling injection of small quantities of fuel begins at 100. At 100, the control module 70 may determine whether the engine 12 is operating at a low load condition. For example, the low load condition may include mixed combustion mode operation of the engine 12. The low load condition, however, may also include when desired fuel injection quantity is less than the predetermined quantity (e.g., 3 mg). If true, control may proceed to 104. If false, control may return to 100.

At 104, the control module 70 may determine the desired fuel injection quantity. At 108, the control module 70 may determine the plurality of fuel injection parameters (e.g., A and B). At 112, the control module 70 may store the plurality of fuel injection parameters (e.g., in memory 92). The control module 70 may then retrieve the plurality of fuel injection parameters and may modify the plurality of fuel injection parameters based on the plurality of engine operating parameters (e.g., IAT, FIP, ECT, etc.)

At 116, the control module 70 may determine the desired fuel injection period based on the desired fuel injection quantity and the plurality of fuel injection parameters. At 120, the control module 70 may control fuel injection by generating control signals for the fuel injectors 30 based on the desired fuel injection period. For example, the control signals for the fuel injectors 30 may include PWM signals having the desired fuel injection period. Control may then return to 100.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine, comprising:
   a parameter determination module that determines a first fuel injection parameter based on a rate of change of a quantity of fuel injected during a period, and that determines a second fuel injection parameter based on an initial quantity of fuel injected during the period; and
   a period determination module that determines a desired fuel injection period based on a desired fuel injection quantity, the first and second fuel injection parameters, and at least one of mass air flow (MAF) rate, intake air temperature (IAT), fuel injector pressure (FIP), engine coolant temperature (ECT), and exhaust gas air/fuel (A/F) ratio.

2. The control system of claim 1, wherein the first and second fuel injection parameters are determined in order to minimize error between the desired fuel injection quantity and an estimated fuel injection quantity.

3. The control system of claim 2, wherein the estimated fuel injection quantity is based on the MAF rate and the exhaust gas A/F ratio.

4. The control system of claim 1, wherein the first and second fuel injection parameters are stored in memory and modified when retrieved from the memory, wherein the retrieved first and second fuel injection parameters are modified based on at least one of IAT, FIP, and ECT.

5. The control system of claim 4, wherein the modification of the retrieved first and second fuel injection parameters is based on mathematical functions of IAT, FIP, and ECT.

6. The control system of claim 4, wherein the desired fuel injection period is based on a sum of the retrieved second parameter and a product of the retrieved first parameter and the desired fuel injection quantity.

7. The control system of claim 1, further comprising:
   an injection control module that generates control signals for fuel injectors of the engine based on the desired fuel injection period, wherein the control signals control the fuel injectors.

8. The control system of claim 7, wherein the control signals include pulse-width modulated (PWM) signals having the desired fuel injection period.

9. The control system of claim 1, wherein the engine includes a homogeneous charge compression ignition (HCCI) engine.

10. The control system of claim 9, wherein the desired fuel injection quantity is based on a desired air/fuel (A/F) ratio and a mass air flow (MAF) rate into the HCCI engine, and wherein the desired A/F ratio is based on at least one of a combustion mode of the HCCI engine and input from a driver of a vehicle powered by the engine.

11. A method for controlling fuel injection in an engine, comprising:
   determining a first fuel injection parameter based on a rate of change of a quantity of fuel injected during a period;
   determining a second fuel injection parameter based on an initial quantity of fuel injected during the period; and
   determining a desired fuel injection period based on a desired fuel injection quantity, the first and second fuel injection parameters, and at least one of mass air flow (MAF) rate, intake air temperature (IAT), fuel injector pressure (FIP), engine coolant temperature (ECT), and exhaust gas air/fuel (A/F) ratio.

12. The method of claim 11, further comprising determining the first and second fuel injection parameters in order to minimize error between the desired fuel injection quantity and an estimated fuel injection quantity.

13. The method of claim 12, wherein the estimated fuel injection quantity is based on the MAF rate and the exhaust gas A/F ratio.

14. The method of claim 11, further comprising:
   storing the first and second fuel injection parameters in memory; and
   when retrieving the first and second fuel injection parameters from the memory, modifying the first and second fuel injection parameters based on at least one of IAT, FIP, and ECT.

15. The method of claim 14, wherein the modification of the retrieved first and second fuel injection parameters is based on mathematical functions of IAT, FIP, and ECT.

16. The method of claim 14, wherein the desired fuel injection period is based on a sum of the retrieved second parameter and a product of the retrieved first parameter and the desired fuel injection quantity.

17. The method of claim 14, wherein the engine includes a homogeneous charge compression ignition (HCCI) engine.

18. The method of claim 17, wherein the desired fuel injection quantity is based on a desired air/fuel (A/F) ratio and a mass air flow (MAF) rate into the HCCI engine, and wherein the desired A/F ratio is based on at least one of a combustion mode of the HCCI engine and input from a driver of a vehicle powered by the engine.

19. The method of claim 11, further comprising:
   generating control signals for fuel injectors of the engine based on the desired fuel injection period, wherein the control signals control the fuel injectors.

20. The method of claim 19, wherein the control signals include pulse-width modulated (PWM) signals having the desired fuel injection period.

* * * * *